United States Patent Office 3,213,710
Patented Oct. 26, 1965

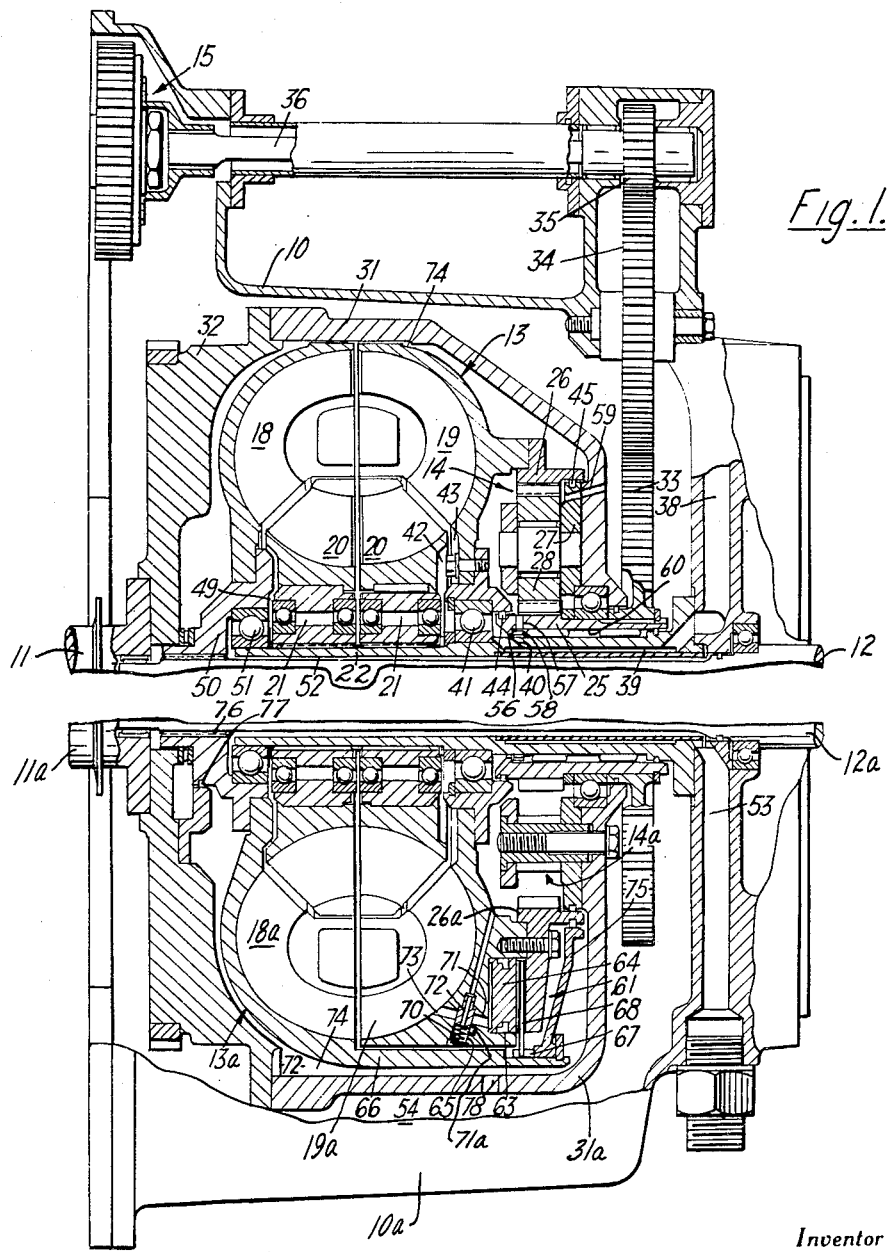

3,213,710
VEHICLE TRANSMISSION
William Joseph Hayward, Stanground, England, assignor to F. Perkins Limited, London, England, a British company
Filed Mar. 25, 1963, Ser. No. 267,450
Claims priority, application Great Britain, Mar. 29, 1962, 12,125/62
9 Claims. (Cl. 74—665)

This invention relates generally to transmissions such as are used in vehicles and more particularly concerns a transmission in which differential gearing directs input power to a supercharger for the engine and through a hydrokinetic torque converter to the vehicle drive wheels.

Heretofore, drives of this kind have required a heavy flywheel which is undesirable from a cost and weight standpoint. With light flywheels, large torsional vibrations are created by the cyclic speed fluctuations of the internal combustion engine driving through the transmission. These vibrations are intensified by the differential gearing whose output components are coupled respectively to the high inertia torque converter pump element and the geared up supercharger.

Therefore, it is an object of the invention to provide a transmission of the above type which greatly increases the flywheel effect on the engine, without appreciable cost or weight, and in which the inertia of the pumping element of the torque converter driven thorugh the differential gear is materially reduced. The effect of these objectives is to smooth the drive to the differential gear, thus reducing vibration and to impose the remaining vibration on the torque converter as well as the supercharger. In this way, vibration is heavily dampened by the interaction of the oil-surrounded converter pump and turbine elements.

Another object is to increase the vibration dampening effect within a transmission of the above character by bathing the differential gearing in oil which, if desired, is discharged at higher speeds when lessened friction becomes more important than the added dampening effect.

A further object is to provide a transmission as referred to above with a clutch for mechanically locking up the torque converter at higher speeds. In more detail, it is an object to provide a transmission clutch as described above which functions automatically at a predetermined rotational speed and which is actuated by the already available fluid pressure within the converter.

Other objects and advantages of the invention will become apparent upon reading the following detailed description and upon reference to the drawings, in which:

FIGURE 1 is a fragmentary, longitudinal section through a transmission constructed in accordance with the invention; and FIG. 2 is similar to FIG. 1 and shows a modified form of transmission, the figures being alined so as to give a more accurate picture of the entire transmission in each of its embodiments.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning to the drawings, FIGS. 1 and 2 show, respectively, upper and lower halves of transmissions constructed in accordance with the invention. The figures are alined so as to better illustrate the complete transmission, and corresponding parts in the two modifications have been given the same reference numerals with the distinguishing suffix "a" added to the modification shown in FIG. 2.

The transmission includes a casing 10 into which passes an input shaft 11 from an internal combustion engine and from which emerges an output shaft 12 connected to the ground engaging drive wheels of the vehicle. Within the casing 10 is a hydrokinetic torque converter 13 and a differential gear 14. A supercharger driving gear assembly 15 is positioned at the top of the transmission unit and is connected in the usual manner to a supercharger operated in conjunction with the internal combustion engine powering the input shaft 11.

The torque converter 13 includes the usual components including a turbine element 18 connected through a splined coupling to the forward, or left-hand, end of the output shaft 12, and a pump element 19 positioned in the usual manner behind the turbine element 18. As is usual, reaction members 20 are connected through overrunning brake assemblies 21 to a stationary tubular shaft 22 surrounding the output shaft 12.

The differential gear 14 is an epicyclic unit positioned rearwardly, i.e., to the right, of the converter 13 and includes a sun gear 25 rotatable on the tubular shaft 22, a ring gear 26 bolted to and thus drivingly connected to the torque converter pump element 19, and a plurality of planet gears 28, of which only one is shown, mounted on a planet carrier 27. The torque converter includes a housing 31 which is secured to a flywheel 32 that is bolted to the input shaft 11 so that the flywheel 32 forms a portion of the torque converter housing and the housing becomes a total portion of the mass of the flywheel. The housing 31 also carries the integrally connected planet carrier 27 which forms the driving or input component of the differential gear 14.

The sun gear 25 is drivingly coupled to the supercharger gear assembly 15 through a gear 33 mounted on the sun gear and a pair of meshing gears 34 and 35 coupled to the assembly 15 through a shaft 36.

In operation, it will be seen that the planet carrier 27 is driven directly by the engine from the input shaft 11 and that the sun gear 25 and the ring gear 26, the output components of the differential gear 14, will be driven at speeds which depend upon the resistance to motion of the driven members connected to each. Thus, for example, if the engine is running at about idling speed, the pump 19 of the converter and the supercharger powered by the gear assembly 15 will also be rotating slowly and, by the nature of these components, they will offer little torsional resistance. If the engine is then accelerated, the planet carrier 27 is also accelerated and will try to accelerate both the converter pump 19 and the supercharger. Normally, however, the resistance of the driven vehicle will be sufficient to hold back the turbine element 18 so that the torsional resistance on the pump element 19 due to the hydraulic reaction in the converter will be very high. Thus, the pump of the converter will not immediately increase in speed by any great amount. As a result, the sun gear, and thus the supercharger, is greatly accelerated due to the differential action of the gear 14, and operation of the supercharger will tend to increase the driving engine's torque output. In this manner, the input torque to the differential gear is increased and this, in turn, supplies more torque to the converter pump element 19 and, hence, to the output shaft 12 until the resistance of the vehicle is overcome and acceleration is achieved with a state of torque balance between the driving engine, the torque converter 13 and the supercharger driven by the assembly 15.

As has been pointed out above, cyclic speed variations in the input shaft 11 which inherently occur with an internal combustion engine have caused breakages and inefficient operation of transmissions of this type since these speed variations were passed on mainly to the supercharger drive which has a much lower moment of inertia than the converter with its high output load. In the present embodiment, however, by the positioning of the various elements, two advantages are achieved. First, the effect of a larger flywheel is obtained without substantially increasing the cost or weight of the unit by including the torque converter housing 31 as a part of the mass of the flywheel 32. The larger flywheel effect tends to reduce the cyclic speed variations and also to reduce the amplitude of the resulting vibrations. Second, by coupling the ring gear output component of the differential gear 14 directly to the torque converter pump element 19, instead of employing the converter housing for this coupling as is normal, the effective moment of inertia of the pump element is reduced considerably. As a result, the cyclic speed variations and the resulting vibrations are more evenly divided between the converter and the supercharger drives and the effects are therefore less serious.

It will also be noted that the converter housing 31 can never rotate at a speed higher than that of the input shaft. This greatly minimizes the stresses which this member must bear as compared to the more conventional practice of connecting the converter housing to the differential ring gear. In such prior arrangements, the overdrive effect caused by the differential gear can produce prohibitive stresses in the casing.

As a feature of the invention, the remaining cyclic speed variations in the transmission are dampened by bathing the components of the differential gear 14 in hydraulic fluid. As is conventional, a continuous flow of oil under pressure is directed to the converter 13 from a duct 38 which is connected to the usual hydraulic pump, not shown. From the duct 38, oil passes through a channel 39 in the tubular shaft 22 to a duct 40 where it flows through a bearing 41 that supports the converter pump element 19. The oil then passes into the converter housing 31 through apertures 42 and 43 between one of the reaction members 20 and the pump element 19. In this manner, the converter elements bounded by the housing 31 and the flywheel 32 are filled with oil under pressure; except for the region surrounding the differential gear 14 which is isolated from the remaining portion of the converter interior by a pair of oil seals 44 and 45 interposed, respectively, between the pump element 19 and the sun gear 25, and the ring gear 26 and the planet carrier 27.

Oil is discharged from the converter 13 through a gap 49 between one of the reaction members 20 and a hub 50 forming a portion of the turbine element 18. The oil flows from the gap 49 through a bearing 51 supporting the turbine element 18 and thence along an annular channel 52 between the shaft 22 and the output shaft 12 that leads to a conduit, corresponding to the conduit 53a in FIG. 2, that directs the oil to a reservoir.

To supply oil to the region surrounding the differential gear 14, a branch 56 from the passage 40 communicates with a plurality of radially extending holes 57 in the sun gear 25 so that oil may pass under pressure to the differential gear. A ring valve 58, described more fully below, controls the flow of oil through the holes 57, and a hole 59 through the planet carrier 27 and the torque converter housing 31 provides a restricted outlet from the region surrounding the differential gear so that a flow of pressurized fluid through this region is permitted.

Due to the presence of pressurized oil surrounding the components of the differential gear 14, a considerable dampening effect is exerted on the intermeshing gear teeth of the differential.

However, at high speeds, the cyclic speed variations considered above become relatively unimportant and, since there is some power loss due to the presence of the oil in the differential gear 14, it is desirable to eliminate this power loss above a predetermined speed. To accomplish this, the valve member 58 is effective to close the passage 57 when a predetermined high rotational speed is achieved. The valve member consists of a circular ring divided into three arcuate sections which rotate along with the sun gear 25 so that, at a predetermined speed, centrifugal force causes the sections to be urged outwardly and pressed against an inner edge 60 of the sun wheel so as to substantially close the passages 57. It is contemplated that spring elements may be provided to hold the segments of the valve member 58 in their contracted open position.

The valve member 58 is thus effective to block the supply of pressurized oil to the differential gear 14 at a predetermined rotational speed, and the oil surrounding the differential gear will then drain off through the passage 59. However, it will be noted that the passage 59 is located some distance radially inward of the differential gear housing so that some of the oil will be retained at the differential gear for normal lubrication purposes.

In FIG. 2, a modification of the transmission is shown wherein a clutch 61 is provided to lock up the converter 13a so that the pump element 19a and the turbine element 18a rotate as a single unit. As a feature of the invention, the clutch is automatically engaged when the transmission exceeds a predetermined rotational speed.

As in the FIG. 1 modification, the converter 13a cooperates with a differential gear 14a whose ring gear 26a is radially elongated to provide a portion 62 that forms a clutch wall. The torque converter pump element 19a has formed in its outer periphery an annular cylinder 63 in which a piston 64 is operable under hydraulic pressure controlled by a centrifugal valve 65. The converter turbine element 18a is formed with a rearwardly extending cylindrical portion 66 extending over the pump element 19a. An annular clutch member 68 is splined at 67 to the turbine element portion 66 and extends between the piston 64 and the clutch wall portion 62.

The valve 65 is a generally cylindrical member normally held in the illustrated closed position by a spring 70. When so positioned, oil is exhausted from the cylinder 63 via a passage 71 to the region surrounding the spring 70 and thence through a hole 72 in the valve to the region surrounding the differential gear 14a. The clutch is thus disengaged.

The value 65 rotates at the same speed as the turbine pump element 19 and, at a speed which is determined by the strength of the spring 70, centrifugal force causes the valve element to shift, downwardly in FIG. 2, so as to allow oil to flow through a passage 73 and the passage 71 to the cylinder 63. This pressurized oil from the converter 13a moves the piston 64 to the right in the drawing so as to lock up the clutch 61 and provide a direct drive from the ring gear 26a to the output shaft 12a. When the unit slows, spring 70 retains the valve element upwardly as shown in FIG. 2 and a passage 71a exhausts fluid from behind the piston 64.

In order to avoid or minimize the presence of oil in the space 74 between the torque converter element 18a and the housing 31a, which of course rotate at different speeds, a sealing ring 75 is interposed between the rearward end of the turbine element portion 66 and the ring gear 26a. In addition, a ring seal 77 is fitted adjacent the forward end of the turbine element 18a so as to prevent oil seepage into the space 74 through the splines 76 connecting the turbine element 18a with the output shaft 12. In addition, a series of peripherally arranged holes 78 are preferably provided in the converter housing 31a so as to exhaust whatever fluid might leak into the space 74.

If desired, the sealing ring 75 can be omitted whereby fluid leaking past the clutch 61 is simply discharged outwardly through the holes 78 without flooding the space 74. This fluid flow is only likely to be significant when the clutch is disengaged, and this occurs at lower speeds where the speed difference between the turbine element 18a and the converter housing 31a is not great so that the effect of any oil present is not particularly serious.

It will be appreciated that by discharging the oil within the housing 31a, centrifugal loadings on the housing are minimized so that it need not be constructed to withstand this additional stress.

I claim as my invention:

1. A transmission for coupling an internal combustion engine to both an output shaft and a supercharger drive gear comprising, in combination, a hydrokinetic torque converter having a housing enclosing a pump element and a turbine element, said turbine element being drivingly coupled to said output shaft, and a differential gear having an input component and two output components, said input component being drivingly coupled to said housing, one of said output components being drivingly coupled to said pump element and the other of said output components being drivingly coupled to said supercharger drive gear.

2. The transmission of claim 1 in which said torque converter housing is in part formed by a flywheel so that the entire housing defines the flywheel mass.

3. A transmission for coupling an internal combustion engine to both an output shaft and a supercharger drive gear comprising, in combination, a hydrokinetic torque converter having a housing enclosing a pump element and a turbine element, said turbine element being drivingly coupled to said output shaft, planet gears mounted within said housing to define a differential planetary unit, a ring gear secured to said pump element in engagement with said planet gears, and a sun gear meshing with said planet gears and being drivingly coupled to said supercharger drive gear.

4. A transmission for coupling an internal combustion engine to both an output shaft and a supercharger drive gear comprising, in combination, a hydrokinetic torque converter having a housing enclosing a pump element and a turbine element, said turbine element being drivingly coupled to said output shaft, a differential gear having an input component and two output components, said input component being drivingly coupled to said housing, one of said output components being drivingly coupled to said pump element and the other of said output components being drivingly coupled to said supercharger drive gear, means including said housing and said pump element defining a gear-housing enclosing said differential gear, and means for supplying hydraulic fluid for filling said gear-housing.

5. A transmission for coupling an internal combustion engine to both an output shaft and a supercharger drive gear comprising, in combination, a hydrokinetic torque converter having a housing enclosing a pump element and a turbine element, said turbine element being drivingly coupled to said output shaft, planet gears mounted within said housing to define a differential planetary unit, a ring gear secured to said pump element in engagement with said planet gears, and a sun gear meshing with said planet gears and being drivingly coupled to said supercharger drive gear, said housing and said pump element defining a gear-housing enclosing said planet gears, ring gear and sun gear, a valve for supplying fluid for filling said gear-housing, and means for closing said valve above a predetermined rotational speed so as to block the flow of fluid to said gear-housing.

6. The transmission of claim 5 in which said gear-housing is provided with a drain opening for partially draining fluid therefrom when the flow of fluid is blocked by said valve.

7. A transmission for coupling an internal combustion engine to both an output shaft and a supercharger drive gear comprising, in combination, a hydrokinetic torque converter having a housing enclosing a pump element and a turbine element, said turbine element being drivingly coupled to said output shaft, a differential gear having an input component and two output components, said input component being drivingly coupled to said housing, one of said output components being drivingly coupled to said pump element and the other of said output components being drivingly coupled to said supercharger drive gear, and a clutch within said housing for selectively locking said pump element and said turbine element together for rotation in unison.

8. The transmission of claim 7 in which the combination includes means for engaging said clutch when the rotation speed of the converter exceeds a predetermined value.

9. A transmission for coupling an internal combustion engine to both an output shaft and a supercharger drive gear comprising, in combination, a hydrokinetic torque converter having a housing enclosing a pump element and a turbine element, said turbine element being drivingly coupled to said output shaft, a differential gear having an input component and two output components, said input component being drivingly coupled to said housing, one of said output components being drivingly coupled to said pump element and the other of said output components being drivingly coupled to said supercharger drive gear, means for supplying hydraulic fluid to said pump and turbine elements, an annular hydraulic clutch disposed within said housing for selectively locking said pump and turbine elements together for rotation in unison, and a centrifugally opening valve interposed in fluid communication between said converter fluid and said clutch for engaging the same when said valve opens under centrifugal force at a predetermined rotational speed.

References Cited by the Examiner
UNITED STATES PATENTS 3,040,589    6/62    Chapman _____ 74—664 X DON A. WAITE, *Primary Examiner.*